May 26, 1959 H. A. ROBINSON 2,888,562

FREQUENCY CONTROL SYSTEM

Filed May 10, 1956 4 Sheets-Sheet 1

INVENTOR.
HARRIS A. ROBINSON
BY
H. A. Rechif
ATTORNEY

INVENTOR.
HARRIS A. ROBINSON
BY F. A. Rechif
ATTORNEY

May 26, 1959 H. A. ROBINSON 2,888,562

FREQUENCY CONTROL SYSTEM

Filed May 10, 1956 4 Sheets-Sheet 3

INVENTOR.
HARRIS A. ROBINSON
BY
[signature]
ATTORNEY

INVENTOR.
HARRIS A. ROBINSON
BY
F.A. Rechif
ATTORNEY 2,888,562

FREQUENCY CONTROL SYSTEM

Harris A. Robinson, Palmyra, N.J., assignor to Radio Corporation of America, a corporation of Delaware Application May 10, 1956, Serial No. 584,103

6 Claims. (Cl. 250—36)

This invention relates to a frequency control system, and more particularly to a control system for stabilizing a multichannel oscillator such as might be used in the transmitter and receiver of a communications system.

Certain types of frequency control systems have previously been developed for multichannel oscillators. An example of such a system may be found in my copending application Serial No. 257,148, filed November 19, 1951, Patent No. 2,754,421, issued July 10, 1956, over which the present invention may be considered to be an improvement. The copending application discloses a system for stabilizing the frequency of a master oscillator at any one of 44,000 possible channel frequencies. The communication channels may be spaced every 500 cycles in a band extending say from 2 to 24 mc. The control system in said application includes a plurality of cascaded mixers to the input of the first of which a sample of the output of the oscillator to be controlled is applied, and various selectable waves of stable frequency are also applied to the respective mixers, to heat the oscillator frequency down to a lower frequency suitable for application to a phase discriminator so as to enable the oscillator frequency to be locked in, as through a reactance tube. In the system of the copending application, in order to provide the required wide frequency range and large number of channels, a plurality of crystals is necessary, for generation of the stable frequency waves to be supplied to the respective mixers. In fact, prior to this invention it has been common practice, in frequency synthesizers utilizing captive oscillator arrangements, to employ a plurality of crystals for generation of the various stable frequencies required.

Single-sideband, suppressed-carrier transmission is becoming increasingly important for communication purposes, mainly because of the economies it offers in transmitter power and in frequency spectrum. With the use of single-sideband-type transmission for communication purposes, the requirements for stability and accuracy of the master oscillator used in transmission and reception are more severe than formerly, when single-sideband, suppressed-carrier transmission was not used. For this type of transmission, the carrier must be resupplied at the receiver, and to avoid noticeable distortion it must be not more than 5 or 10 c.p.s. off the correct frequency. As another example of the stability and accuracy requirements, formerly (when other than single-sideband transmission was used) an accuracy of one part in $10^5$ (100 cycles in 10 mc.) was called for, but now (with single-sideband transmission) this has increased to one part in $10^7$ (1 cycle in 10 mc.).

As a practical matter, it is impossible to obtain the stability and accuracy required for single sideband communication, when a plurality of crystals are employed in the frequency control or captive oscillator control system. The crystals used in the arrangement described in my aforesaid application, or in analogous arrangements, may have an accuracy on the order of plus or minus 9 c.p.s. each referred to 10 mc., an accuracy clearly not sufficient to meet the present stability and accuracy requirements, particularly if two or more of the crystals happen to be off frequency in opposite directions. Moreover, it would be prohibitively expensive to make all of the plurality of crystals used of sufficient accuracy to meet the requirements. Also, no system previously known has been able to achieve the desired wide range multichannel action for the captive oscillator, while employing only a single crystal to obtain all of the stable and highly accurate frequencies required.

An object of this invention is to devise an improved frequency control system for a multichannel captive oscillator, by means of which a stability and accuracy several orders of magnitude greater than that previously obtainable may be achieved.

Another object is to provide an improved control system for a multichannel oscillator which requires only a single crystal of extreme accuracy for the stabilization or locking-in of all the stable frequencies required.

A further object is to devise a novel frequency control system for a multichannel captive oscillator, with sufficient accuracy and stability to enable use of the captive oscillator in a single-sideband, suppressed-carrier communications system.

The objects of this invention are accomplished, briefly, in the following manner: A sample of the output of the master (captive) oscillator to be controlled is fed into the first of a plurality of mixers arranged in cascade. A separate single crystal oscillator of extreme accuracy is utilized, and by means of frequency dividers a plurality of stable reference frequency waves are obtained from this crystal for ultimate stabilization of the captive oscillator. Each of the mixers referred to is also supplied with a wave which is harmonically related to and locked to a respective one of the stable reference frequency waves. The waves fed to the respective mixers may be derived from the respective reference frequency waves through harmonic generators, or they may be derived from respective oscillators which are locked to harmonics of the respective reference frequency waves, by means of pulse-locking arrangements. The output of the final mixer is fed as one input to a phase discriminator having two inputs and an output; the other input to the phase discriminator is provided by an oscillator which is locked to a harmonic of one of the reference frequency waves, by means of a pulse-locking arrangement. The output of the phase discriminator controls the master (captive) oscillator by means of a suitable reactance tube. The various channels of the master (captive) oscillator are selected by suitable switching in the harmonic generators or various locked oscillators.

A detailed description of the invention follows, taken in conjunction with the accompanying drawings, wherein.

Figure 1:
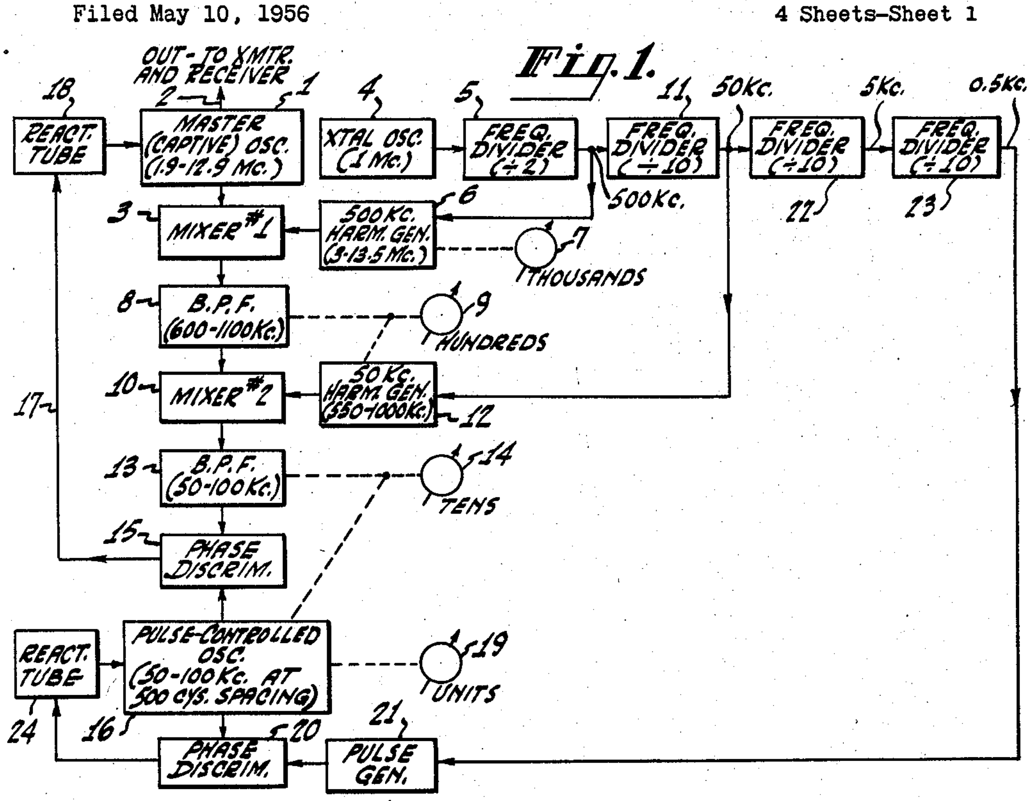
Fig. 1 is a block diagram of a frequency control system utilizing the invention.

Referring now to the drawings, Fig. 1 is a block diagram of a frequency generator arrangement or captive oscillator system using only one crystal and designed to lock a master (captive) oscillator 1 to any one of 22,000 possible frequency channels spaced 500 cycles apart in the range of 1.9 to 12.9 mc. Oscillator 1 is intended to be used as a local oscillator in a transmitter and receiver (not shown), and so the main part of the output of oscillator 1 is taken off by means of a connection indicated schematically at 2, and fed to the said transmitter and receiver.

In order to control and stabilize the frequency of oscillator 1, that is, to lock its output to any selected one of the 22,000 channels, a frequency control system is used. This will now be described. A sample of the output of oscillator 1 is fed as one input to the first mixer 3 of a series or plurality of cascaded mixers, shown as two in number in Fig. 1. A single crystal 4 of extreme accuracy provides, by means of a series of cascaded frequency dividers, all of the stable reference frequency waves required by the system. As indicated, oscillator 4 preferably has a frequency of 1 mc. Since the crystal 4 is so accurate and stable, the various reference frequency waves are all equally accurate and stable, because the various frequency dividers are all driven directly from crystal 4. The first frequency divider 5 divides the frequency of oscillator 4 by two, to produce a stable reference frequency of 500 kc., which is fed to the input of a harmonic generator 6. Generator 6 generates harmonics of the 500-kc. input frequency fed thereto and is tunable (switchable) by means of a "thousands" dial and switch 7 to select and pass on to mixer 3, as the second input thereto, any one of the 6th through 27th harmonics of the 500-kc. input frequency, that is, any selected one of the 500-kc. harmonic frequencies between 3 and 13.5 mc. Thus, a reference frequency wave harmonically related to and locked to the 500-kc. reference frequency wave is fed from harmonic generator 6 into mixer 3. The wave outputs of oscillator 1 and harmonic generator 6 are mixed in mixer 3, producing various beat frequencies.

The output of the first mixer 3 is fed to the input of a bandpass filter 8 which is switchable (by means of a "hundreds" dial and switch 9) to pass a selected frequency lying in the range of 600 to 1100 kc. In this way, the proper beat frequency is selected from the output of mixer 3 and passed on to the rest of the frequency control system, the setting of filter 8 to pass the proper frequency being effected by means of the dial and switch 9.

The output of filter 8 is applied as one input to the second mixer 10 of the plurality of cascaded mixers. The second frequency divider 11 is excited from the output of divider 5 (and thus indirectly from crystal 4), and divides the 500-kc. output of divider 5 by ten, to produce a stable reference frequency of 50 kc., which is fed to the input of a harmonic generator 12. Generator 12 generates harmonics of the 50-kc. input frequency fed thereto and is tunable (switchable) by means of the "hundreds" dial 9 to select and pass on to mixer 10, as the second input thereto, any one of the 11th through 20th harmonics of the 50-kc. input frequency, that is, any selected one of the frequencies between 550 and 1000 kc. Again, a reference frequency wave harmonically related to and locked to the 50-kc. reference frequency wave is fed from harmonic generator 12 into mixer 10. The wave outputs of filter 8 (mixer 3) and harmonic generator 12 are mixed in mixer 10, producing various beat frequencies.

The output of the second mixer 10 is fed to the input of a bandpass filter 13 which is switchable (by means of a "tens" dial and switch 14) to pass various selected frequencies lying in the range of 50 to 100 kc. In this way, the proper beat frequency is selected from the output of mixer 10 and passed on to the rest of the frequency control system, the setting of filter 13 to pass the proper frequency being effected by means of the dial and switch 14.

The output of filter 13 is applied as one input to a phase discriminator 15 having two inputs and a single output. The other input to discriminator 15 is obtained from an oscillator 16, which is pulse-controlled in a manner to be described hereinafter to operate at any selected one of a plurality of discrete frequencies spaced apart 500 cycles, in the range of 50 to 100 kc. Thus, the two inputs to phase discriminator 15 (that from filter 13 or mixer 10 and that from oscillator 16) both lie in the range of 50 to 100 kc. Discriminator 15 is an untuned or aperiodic device which operates to compare the two inputs thereto and to produce a voltage output (control voltage) whose amplitude and sign (polarity) depend upon the magnitude and sense of the phase difference between such inputs. The frequencies of the two inputs are assumed to be equal. The output connection 17 of discriminator 15 leads to a reactance tube 18 coupled in frequency-controlling relation to the master oscillator 1, whereby the output of the discriminator locks in or stabilizes the frequency of oscillator 1 by means of such reactance tube.

Oscillator 16 is tunable (switchable) by means of a "units" dial and switch 19, as well as by "tens" dial 14, to tune it to any one of the various discrete frequencies (spaced 500 cycles apart) in the range of 50 to 100 kc. Another portion of the output of oscillator 16 (in addition to that portion of the oscillator output fed to discriminator 15) is fed as one input to a phase discriminator 20 having two inputs and a single output. An example of particular circuitry which can be used for phase discriminators 15 and 20 will be given hereinafter. The other input to discriminator 20 is obtained from a pulse generator 21, which supplies pulses occurring at a rate of 500 pulses per second (p.p.s.) to the discriminator. These pulses are locked to the single extremely accurate crystal 14, by way of a pair of cascaded frequency dividers 22 and 23 each providing a division ratio of ten, the first one 22 of these dividers being supplied by the 50-kc. output of frequency divider 11. It will be remembered that frequency divider 11 is excited from crystal 4 by way of frequency divider 5. The wave output of divider 23, like the outputs of dividers 5 and 11, is a highly accurate and stable reference frequency wave derived from crystal 4. The 0.5-kc. substantially sinusoidal reference frequency wave output of divider 23 provides the excitation for pulse generator 21, which converts the substantially sinusoidal wave to short, sharp pulses having the same periodicity or recurrence rate as the sine wave excitation, that is, having a recurrence rate of 500 p.p.s., one pulse being produced for each cycle of the 500-c.p.s. sine wave excitation.

The 500-p.p.s. output of pulse generator 21 is fed as one input to phase discriminator 20, the other input to this discriminator being furnished by the pulse-controlled oscillator 16. The output of discriminator 20 is applied to a reactance tube 24 which is coupled in frequency-controlling relation to the pulse-controlled oscillator 16, whereby the output of discriminator 20 locks in the frequency of oscillator 16 by means of this reactance tube. In a manner to be described in detail hereinafter, using the phase discriminator 20 and reactance tube 24, the oscillator 16 is locked or synchronized to a selected harmonic of the 500-p.p.s. crystal-derived output of generator 21, so that this oscillator (which may thus be termed a pulse-controlled oscillator) provides an output of any selected one of a plurality of predetermined frequencies spaced 500 c.p.s. apart. This is true since oscillator 16 may be synchronized to a series of successive harmonics of the pulse recurrence rate of pulse generator 21 (which is 500 p.p.s.).

Figure 2:
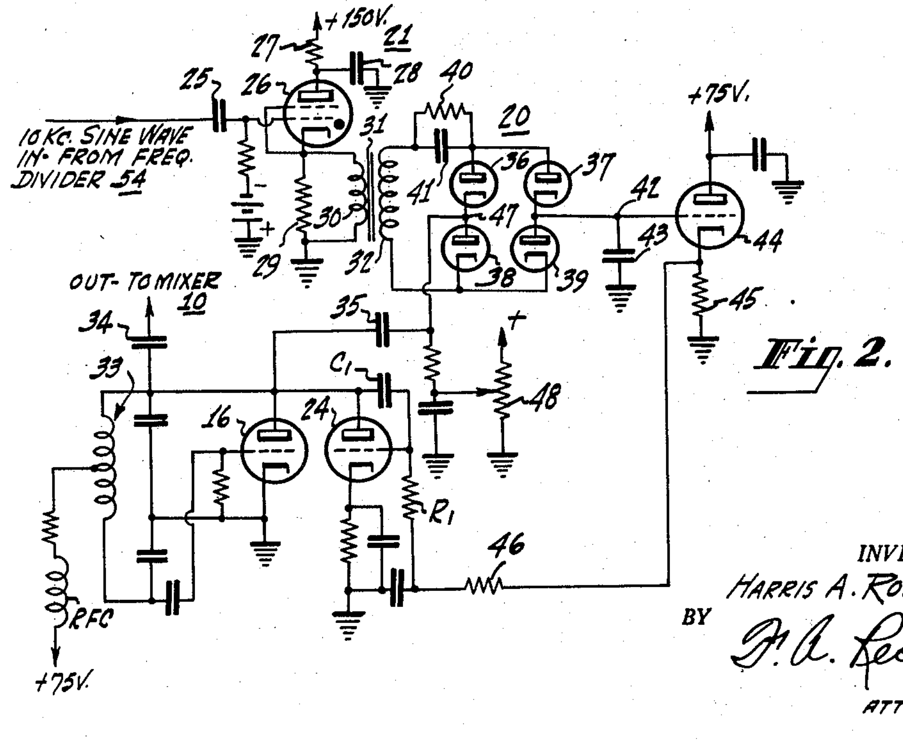
Fig. 2 is a detailed circuit diagram applicable to certain parts of Figs. 1 and 3.

Fig. 2 may be consideerd to disclose detailed circuitry applicable to items 16, 20, 21, and 24 of Fig. 1, although in Fig. 2 the legends on the input and output really apply to another embodiment of the frequency control system, to be described hereinafter. In Fig. 2 as thus modified for application to Fig. 1, the 0.5-kc. (500 c.p.s.) sine wave from frequency divider 23 is applied through a coupling capacitor 25 to the first or control grid of a gas tetrode 26 which tetrode is connected by means of a series resistor 27 and a capacitor 28 (in shunt across the anode-cathode path of tube 26) to provide a relaxation oscillator circuit. The time constant of the RC circuit 27, 28 (the charging circuit for capacitor 28) is a little faster than the periodicity of the 500-c.p.s. wave supplied to the control grid of tube 26, so that capacitor 28 becomes fully charged between positive excursions of the voltage applied to this grid. When the grid of tube 26 is driven positively, gas tetrode 26 fires to discharge capacitor 28 rapidly through tube 26, thus completing the sawtooth voltage wave which is initiated by the charging of the capacitor. The rapid discharge of capacitor 28 produces a short, sharp pulse of current through resistor 29 (which is connected from the cathode of tube 26 to ground), which pulse is applied to the primary winding 30 of a pulse transformer 31. The components 26—31 comprise the pulse generator 21. Since the capacitor 28 discharges each time the grid of tube 26 is driven positive (at a 500-cycle rate), pulses having a recurrence rate of 500 p.p.s. are produced in push-pull (that is, so as to have opposite polarities) at the two ends of the secondary winding 32 of pulse transformer 31. The arrangement is such that positive pulses appear at the upper end of winding 32.

A triode vacuum tube 16 with the LC oscillatory circuit 33 forms an oscillator which is of the modified Hartley type. The tube 16 provides the pulse-controlled oscillator which is synchronized or locked to harmonics of the 500-p.p.s. pulses supplied by pulse generator 21. The frequency of the output of oscillator 16 is influenced by the reactance tube 24, as well as by the components of circuit 33.

The "tens" switch 14 and the "units" switch 19 control the frequency of oscillator 16 to set it close to any selected one of a plurality of frequencies which are harmonics of 500 c.p.s. and which lie between 50 and 100 kc. This frequency selection is accomplished in any suitable way, as by switching of a selected oscillatory circuit 33 into the oscillator.

An alternating voltage of the oscillator 16 frequency which leads in phase about 90° with respect to the alternating anode voltage, is supplied to the grid of tube 24 via the phase-shifting network $C_1$, $R_1$. This causes the anode current of tube 24 to be about 90° leading in phase with respect to the anode voltage, and the impedance of tube 24, between anode and cathode, will have a reactive character. The extent of the equivalent reactance depends, among other things, upon the mutual conductance of tube 24 and hence may be influenced by the voltage applied to its grid.

A portion of the output of the pulse-controlled oscillator 16 is taken off from the oscillatory circuit 33 via a connection labeled "Out—to Mixer" and fed through a capacitor 34 to phase discriminator 15, the output of which controls, stabilizes, or locks in the frequency of master oscillator 1 by means of the reactance tube 18.

In order to provide a control loop for the oscillator 16, to make this oscillator a pulse-controlled one, a sample of the oscillator output is taken off from the oscillatory circuit 33 and is fed through a capacitor 35 to the phase discriminator 20, to which the ends of the pulse transformer secondary winding 32 are also connected. The phase discriminator 20 comprises four diodes 36, 37, 38, and 39 connected in a bridge arrangement. Although these are shown in Fig. 2 as vacuum tube diodes, they may be semiconductor rectifiers. The two inputs to the phase discriminator 20 are the 500-p.p.s. pulses (from pulse transformer 31) and the output of the oscillator 16. The 500-p.p.s. pulses are the reference frequency and as such do not vary. The anode-cathode paths of diodes 36 and 38 are connected in series across the secondary winding 32 (the connection to the upper end of winding 32 being made through a resistor 40 and a capacitor 41 connected in parallel), and the anode-cathode paths of the other two diodes 37 and 39 are connected in series, with the series combination across the first diode series combination. Capacitor 35 feeds the output of oscillator 16 to the common junction 47 of the diode 36 cathode and the diode 38 anode. A suitable bias voltage may be applied to this junction, as indicated.

The output of phase discriminator 20 is taken from the common junction 42 of the diode 37 cathode and the diode 39 anode, and a storage capacitor 43 is connected from this point 42 to ground. Point 42 is also connected to the grid of a triode vacuum tube 44 connected as a cathode follower, and the voltage across the cathode resistor 45 of this cathode follower circuit is applied to the grid of reactance tube 24 through resistors 46 and $R_1$.

When the pulses of opposite polarity produced at the ends of secondary winding 32 are applied to the diodes, all four diodes will conduct simultaneously (since positive pulses are produced at the upper end of winding 32), and their effects will equalize the potential at points 47 and 42.

However, the condition existing when all four diodes are conducting is a short-circuit from point 47 to point 42. In other words, the diodes act as switches which connect point 47 to point 42 at the peaks of the pulses appearing in winding 32, since the four diodes are caused to conduct simultaneously when the pulses appear in secondary winding 32. Since the substantially sinusoidal voltage output of the oscillator 16 is applied to point 47, the instant the pulses are applied to the diodes some portion of this sinusoidal voltage wave will be sampled and applied to terminal 42 of the capacitor 43, charging the capacitor to this value. If the frequency of the sinusoidal alternating voltage output of oscillator 16 is a whole multiple of the rate of recurrence of the pulses, the same point of the sine wave will be sampled each time a pulse is applied for switching, and the capacitor 43 will hold a constant charge. The capacitance of capacitor 43 is so large that a practically ripple-free unidirectional control voltage occurs across such capacitor, and the amplitude of this depends upon the relative phasing of the pulses and the sinusoidal output of oscillator 16 (that is, upon the amplitude of the sinusoidal wave at the time of the pulses, when sampling occurs). If the relative phasing of the pulses and the sinusoidal output of oscillator 16 is slightly changed, a different portion of the sinusoidal wave will be sampled and the capacitor 43 will charge or discharge through the short-circuit path from point 42 to point 47 (which path is established in the manner previously described, when all four diodes are caused to conduct simultaneously due to the effect of the pulses), to the new value. The average value of the unidirectional control voltage across capacitor 43 is obtained when the pulses in winding 32 occur at exactly that moment when the sinusoidal alternating voltage output of oscillator 16 passes through zero. A very small deviation from this particular phasing causes a larger or smaller control voltage to be developed across capacitor 43.

The unidirectional control voltage across capacitor 43 is applied to the grid of the D.C.-coupled cathode follower triode 44, and the D.C. output voltage appearing across cathode resistor 45 is applied to the grid of the reactance tube 24, to influence the frequency of oscillator 16. If the frequency of oscillator 16 changes an amount which is not too large, the phasing of the sinusoidal voltage output of oscillator 16 will change with respect to that of the pulses, causing the control voltage across capacitor 43 to be altered, and the variation in the oscillator frequency is compensated. Thus, the frequency of oscillator 16 remains equal to a whole multiple of the recurrence frequency of the 500-p.p.s. pulses applied to phase discriminator 20, and derived from the reference crystal 4. Oscillator 16 is thus controlled by the pulses derived from the pulse generator 21, so that it may be locked in or synchronized at various harmonics of the 500-p.p.s. recurrence frequency of the pulses provided by generator 21. These pulses are in turn developed from the reference frequency wave output of divider 23, as previously described.

If this synchronization of oscillator 16 by the pulses has not occurred at the moment of switching on, there will be a periodic variation of the voltage produced across capacitor 43; in other words, an alternating control voltage is obtained by which the oscillator voltage is frequency modulated. If, during this modulation, the oscillator frequency passes a value which is equal to a whole multiple of the pulse frequency, the oscillator frequency will remain at this value.

Synchronization of the oscillator 16 may occur when the ratio between its frequency and the pulse recurrence frequency is a large integer. For example, as illustrated in Fig. 1, the oscillator 16 at one end of its range is locked to the 100th harmonic of the 500-p.p.s. pulses, and at the other end of its range it is locked to the 200th harmonic of the 500-p.p.s. pulses. The maximum value of the harmonic to which an oscillator such as 16 may be synchronized by a pulse-controlling or pulse-locking arrangement of the type described is dependent upon the duration of the pulses. For, if the frequency of the oscillator voltage is so high that the duration of one cycle thereof is equal to the duration of the pulses, the time integral of the oscillatory voltage as periodically sampled by phase discriminator 20 would be independent of the relative phase position of the sinusoidal output of oscillator 16 and the pulses, so that, with a phase shift of the oscillator voltage with respect to the pulses, no alteration would occur in the control voltage across capacitor 43.

As previously described, the output of oscillator 16 is fed as one of the two inputs to phase discriminator 15, which latter device supplies a control voltage (output) which is fed, via connection 17, to the frequency control device (reactance tube) 18, which varies the frequency of the master oscillator 1. Since the pulse-controlled oscillator 16 is controlled by 500-p.p.s. pulses derived by division from the accurate reference crystal oscillator 4, the discrete frequencies of oscillator 16 are 500 cycles apart. Thus, the arrangement in Fig. 1, with a master oscillator tuning range of 11 mc., is limited to a total of $$\frac{11\times 10^6}{500}$$

or 22,000, possible channels.

Figure 3:
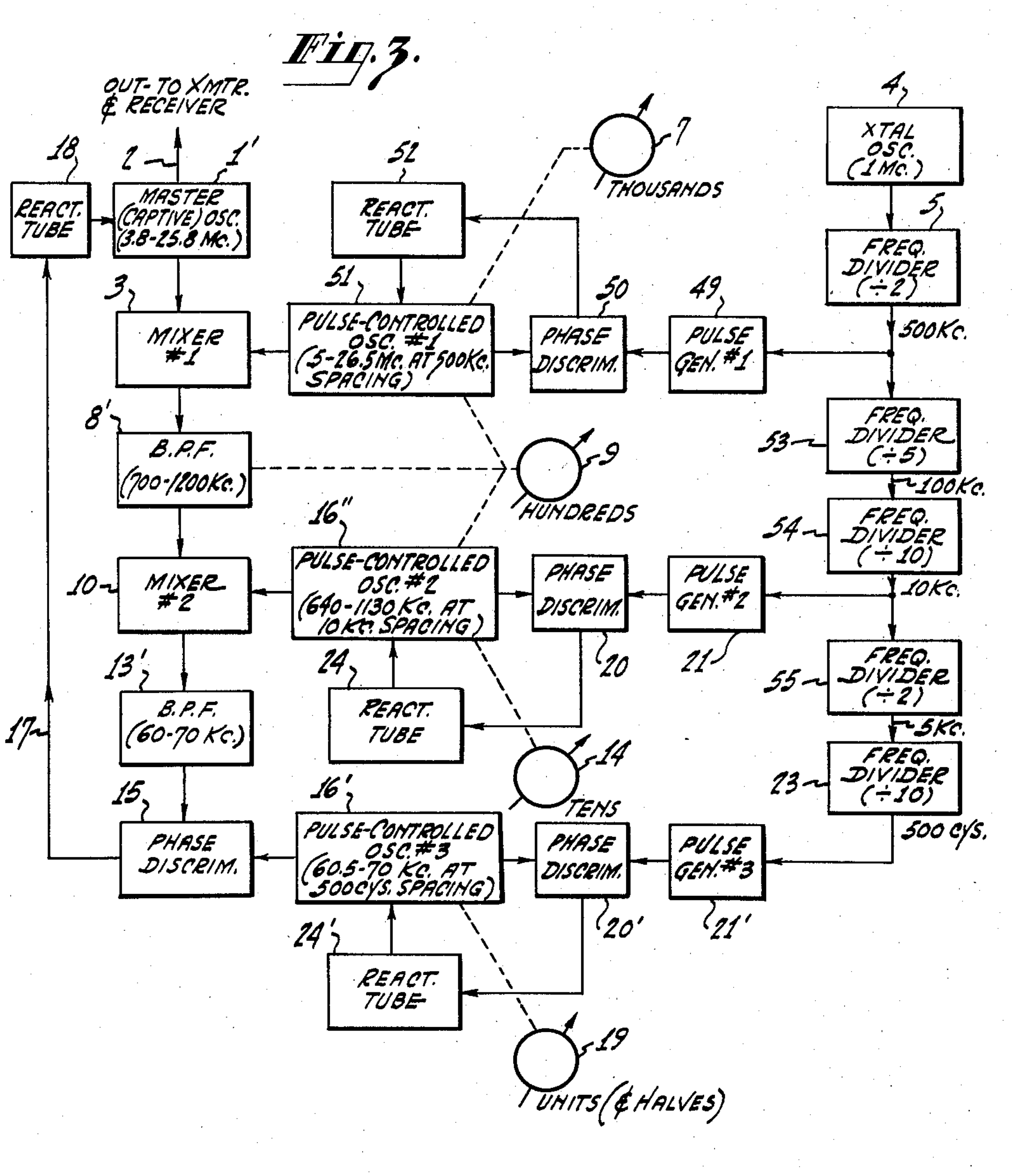
Fig. 3 is a block diagram of another frequency control system utilizing the invention.

Fig. 3 is a block diagram of another embodiment of the invention, which extends the pulse-controlled oscillator principle of Fig. 1 in such a way as to replace the harmonic generators 6 and 12 of Fig. 1 by oscillators controlled by pulses derived from the reference crystal. In fact, the system of Fig. 3 represents a simplification in circuitry as compared to that of Fig. 1, since each harmonic generator has two tuned circuits, whereas each pulse-controlled oscillator has only one. Also, fewer tubes are required for the pulse-controlled or pulse-locked arrangement than for the arrangement using harmonic generators. Fig. 3 illustrates a 44,000-channel frequency generator or captive oscillator system, arranged for decade dial (direct reading) frequency selection and requiring only three pulse-controlled oscillators. In this system, the master or captive oscillator 1′ can be locked to any one of 44,000 possible frequency channels spaced 500 cycles apart in the range of 3.8 to 25.8 mc.

In Fig. 3, a sample of the output of oscillator 1′ is fed as one input to the first mixer 3 of a plurality of cascaded mixers, shown as two in number. The first frequency divider 5, which receives the output of the extremely accurate crystal oscillator 4 and divides such output by a factor of two to produce a highly stable 500-kc. reference frequency wave, supplies input of substantially sinusoidal waveform to the input of a first pulse generator 49 which generates sharp pulses therefrom at a recurrence rate of 500,000 p.p.s. Pulse generator 49 will be described more in detail hereinafter. The pulse output of generator 49 is fed as one of the two inputs to phase discriminator 50, so as to provide a series of extremely stable reference frequency pulses to this discriminator. The other input to discriminator 50 is obtained by sampling the output of a first pulse-controlled oscillator 51, which is pulse controlled to operate at any selected one of a plurality of discrete frequencies spaced apart 500 kc., in the range of 5 to 26.5 mc. These frequencies cover the 10th through 53rd harmonics of the 500-kc. pulse frequency.

The output of discriminator 50 is applied to a reactance tube 52 coupled in frequency-controlling relation to the oscillator 51, whereby the output of the discriminator locks in or stabilizes the frequency of oscillator 51 by means of this reactance tube. In a fashion quite similar to that previously described in connection with oscillator 16 in Fig. 1, the oscillator 51 is locked or synchronized to a selected harmonic of the 500,000-p.p.s. crystal-derived output of generator 49, so that this oscillator (which may thus be termed a pulse-controlled oscillator) provides an output of any selected one of a plurality of predetermined frequencies spaced 500 kc. apart. This is true since oscillator 51 is synchronized to a series of successive harmonics of the pulse recurrence rate of generator 49 (which is 500,000 p.p.s.). By means of the control loop including the phase discriminator 50 and the reactance tube 52, the frequency of oscillator 51 is caused to remain equal to a whole multiple of the recurrence frequency of the pulses applied from generator 49 to phase discriminator 50 (which pulses are derived ultimately from reference crystal 4).

The first pulse-controlled oscillator 51 has its forty-four frequencies (corresponding to the megacycles of the final desired frequency of oscillator 1′ and selected by the "thousands" dial 7) arranged in two groups 5, 6, 7, . . . 26 mc. and 5.5, 6.5, 7.5, . . . 26.5 mc. The "thousands" dial 7 has an associated switch which is coupled to oscillator 51 to select the appropriate frequency for this oscillator. In addition, the "hundreds" dial 9 has an associated switch which is coupled to oscillator 51 to select the appropriate one of the two groups of the oscillator 51 frequencies mentioned above. More specifically, for settings of the "hundreds" dial 9 from 0–4 inclusive, the first group of oscillator 51 frequencies are utilized, and for settings of the "hundreds" dial from 5–9 inclusive, the second group of oscillator 51 frequencies are utilized.

Pulse-controlled oscillator 51 provides, as the second input to mixer 3, an output wave having a frequency which is equal to a selected one of the 500-kc. harmonics located between 5 and 26.5 mc. Therefore, a reference frequency wave harmonically related to and locked to the 500,000-p.p.s. pulses (derived from crystal 4, by way of generator 49) is fed from pulse-controlled oscillator 51 into mixer 3. The wave outputs of oscillators 1′ and 51 are mixed in mixer 3, producing various beat frequencies.

The output of mixer 3 is fed to the input of a band-pass filter 8′ which is switchable (by means of "hundreds" switch 9) to pass a selected frequency lying in the range of 700 to 1200 kc. The output of filter 8′ is applied as one input to the second mixer 10, which is in the plurality of cascaded mixers.

Frequency dividers 53 (division ratio, five) and 54 (division ratio, ten) are cascaded in that order and excited from the 500-kc. output of divider 5, to produce a stable reference frequency of 10 kc. which is fed to the input of a second pulse generator 21. Pulse generator 21 operates to generate sharp pulses having a recurrence rate of 10,000 p.p.s. from the 10-kc. substantially sinusoidal input thereto, which input is obtained from frequency divider 54. The pulse output of generator 21 is fed as one of the two inputs to phase discriminator 20, so as to provide a series of extremely stable reference frequency pulses to this discriminator. The other input to discriminator 20 is obtained by sampling the output of a second pulse-controlled oscillator 16'', which is pulse-controlled to operate at any selected one of a plurality of discrete frequencies spaced apart 10 kc., in the range 640 to 1130 kc. These frequencies cover the 64th through 113th harmonics of the 10-kc. pulse frequency. The output of discriminator 20 is applied to a reactance tube 24 coupled in frequency-controlling relation to the oscillator 16'', whereby the output of the discriminator locks in or stabilizes the frequency of oscillator 16'' by means of this reactance tube. Again in a fashion quite similar to that previously described in connection with oscillator 16 in Fig. 1, the oscillator 16'' is locked or synchronized to a selected harmonic of the 10,000-p.p.s. crystal-derived output of generator 21, so that this oscillator (which may thus be termed a pulse-controlled oscillator) provides an output of any selected one of a plurality of predetermined frequencies spaced 10 kc. apart. Oscillator 16'' is synchronized to a series of successive harmonics of the pulse recurrence rate of pulse generator 21 (which rate is 10,000 p.p.s.). By means of the control loop including the phase discriminator 20 and the reactance tube 24, the frequency of oscillator 16'' is caused to remain equal to a whole multiple of the recurrence frequency of the pulses applied from generator 21 to phase discriminator 20 (which pulses are derived ultimately from reference crystal 4).

The second pulse-controlled oscillator 16'' has a total of fifty frequencies arranged in ten vertical columns and five horizontal rows, as shown in the following table:

*Frequency table (kc.)*

| | | | | | | | | | |
|---|---|---|---|---|---|---|---|---|---|
| 1,130 | 1,120 | 1,110 | 1,100 | 1,090 | 1,080 | 1,070 | 1,060 | 1,050 | 1,040 |
| 1,030 | 1,020 | 1,010 | 1,000 | 990 | 980 | 970 | 960 | 950 | 940 |
| 930 | 920 | 910 | 900 | 890 | 880 | 870 | 860 | 850 | 840 |
| 830 | 820 | 810 | 800 | 790 | 780 | 770 | 760 | 750 | 740 |
| 730 | 720 | 710 | 700 | 690 | 680 | 670 | 660 | 650 | 640 |

The "tens" dial and switch 14 and the "hundreds" dial and switch 9 are both coupled to oscillator 16''. The "tens" dial 14 has an associated switch which is coupled to oscillator 16'' to select the required frequency from one of the ten vertical columns. The "hundreds" dial 9 has a switch coupled to oscillator 16'' for selecting the required frequency from one of the five horizontal rows, in addition to its function in selecting the appropriate one of the two groups of the oscillator 51 frequencies, as previously described. For settings of the "hundreds" dial 9 in the range 0, 1, 2, 3, 4 the first group of oscillator 51 frequencies mentioned above (5, 6, . . . 26 mc.) are utilized and the five respective horizontal rows of oscillator 16'' frequencies in the above "frequency table." For settings of the "hundreds" dial in the range 5, 6, 7, 8, 9 the second group of oscillator 51 frequencies mentioned above (5.5, 6.5 . . . 26.5 mc.) are utilized and the five respective horizontal rows of oscillator 16'' frequencies in the above table are used again.

Pulse controlled oscillator 16'' provides, as the second input wave to mixer 10, an output wave having a frequency which is equal to a selected one of the 10-kc. harmonics located between 640 and 1130 kc. Therefore, a reference frequency wave harmonically related to and locked to the 10,000-p.p.s. pulses (derived from crystal 4, by way of generator 55) is fed from pulse-controlled oscillator 16'' into mixer 10. The wave outputs of bandpass filter 8' and oscillator 16'' are mixed in mixer 10, producing various beat frequencies.

The output of mixer 10 is fed to the input of a bandpass filter 13' which passes a selected frequency lying in the range of 60–70 kc. The output of filter 13' is applied as one input to the phase discriminator 15.

Frequency dividers 55 (division ratio, two) and 23 (division ratio, ten) are cascaded in that order and excited from the 10-kc. output of divider 54, to produce a stable reference frequency of 500 c.p.s. which is fed to the input of a third pulse generator 21'. Pulse generator 21' operates to generate sharp pulses having a recurrence rate of 500 p.p.s. from the 500-c.p.s. substantially sinusoidal input thereto, which input is obtained from frequency divider 23. The pulse output of generator 21' is fed as one of the two inputs to phase discriminator 20', so as to provide a series of extremely stable reference pulses to this discriminator. The other input to discriminator 20', as in Fig. 1, is obtained by sampling the output of a third pulse-controlled oscillator 16', which is pulse-controlled to operate at any selected one of a plurality of discrete frequencies spaced apart 500 c.p.s., in the range of 60.5 to 70 kc. These frequencies cover the 121st through 140th harmonics of the 500-p.p.s. pulse frequency. The output of discriminator 20' is applied to a reactance tube 24' coupled in frequency-controlling relation to the oscillator 16', whereby the output of the discriminator locks in or stabilizes the frequency of oscillator 16' by means of this reactance tube. Again in a fashion quite similar to that previously described in connection with oscillator 16 in Fig. 1, the oscillator 16' is locked or synchronized to a selected harmonic of the 500-p.p.s. crystal-derived output of generator 21', so that this oscillator (which is a pulse-controlled oscillator) provides an output of any selected one of a plurality of predetermined frequencies spaced 500 c.p.s. apart. Oscillator 16' is synchronized to a series of successive harmonics of the pulse recurrence rate of pulse generator 21' (which is 500 p.p.s.) By means of the control loop including the phase discriminator 16' and the reactance tube 24', the frequency of oscillator 16' is caused to remain equal to a whole multiple of the recurrence frequency of the pulses applied from generator 21' to phase discriminator 20' (which pulses are derived ultimately from reference crystal 4).

The third pulse-controlled oscillator 16' has a total of twenty frequencies (70, 69.5, 69 . . . 60.5 kc.) one of which is selected by the "units (and halves)" dial and switch 19 the switch part of which is coupled to oscillator 16'.

Pulse-controlled oscillator 16' provides, as the second input to phase discriminator 15, an output wave having a frequency which is equal to a selected one of the 500-c.p.s. harmonics located between 60.5 and 70 kc. Therefore, a reference frequency wave harmonically related to and locked to the 500-p.p.s. pulses (derived from crystal 4, by way of generator 21') is fed from pulse-controlled oscillator 16' into phase discriminator 15. The two inputs to phase discriminator 15 (that from filter 13' or mixer 10 and that from oscillator 16') both lie in the range of about 60 to 70 kc. Discriminator 15 is an untuned or aperiodic device which operates to compare the two inputs thereto and to produce a voltage output (control voltage) whose amplitude and sign (polarity) depend upon the magnitude and sense of the phase difference between such inputs. The frequencies of the two inputs are assumed to be equal. The output connection 17 of discriminator 15 leads to a reactance tube 18 coupled in frequency-controlling relation to the master oscillator 1', whereby the output of the discriminator locks in or stabilizes the frequency of oscillator 1' by means of this reactance tube.

It may be seen that in the frequency generator systems of Figs. 1 and 3 all pulse frequencies for locking in the pulse-controlled oscillators are derived from the single reference crystal 4 (by division), and hence the accuracy of each entire frequency generator is of the same order as that of the extremely accurate, precision reference crystal. It will be noted that in each of these two systems there is only a single reference crystal.

Fig. 2 is a detailed circuit diagram of typical circuitry which might be used for the second pulse-controlled oscillator system 21, 20, 24, 16'' and also for the third pulse-controlled oscillator system 21', 20', 24', 16', both of Fig. 3. This schematic has been legended as the second pulse-controlled oscillator system, which is synchronized by a 10-kc. wave from frequency divider 54, and the pulse-controlled output of which feeds into mixer 10. The oscillator tube 16 in Fig. 2 would then correspond to pulse-controlled oscillator 16″ of Fig. 3. As just stated, the circuitry for the third pulse-controlled oscillator system, which is synchronized by a 500-cycle wave from frequency divider 23, and the pulse-controlled output of which feeds into phase discriminator 15, can be quite similar to that shown in Fig. 2. The circuitry of Fig. 2 has already been explained in detail, so the description will not be repeated.

Figure 4:
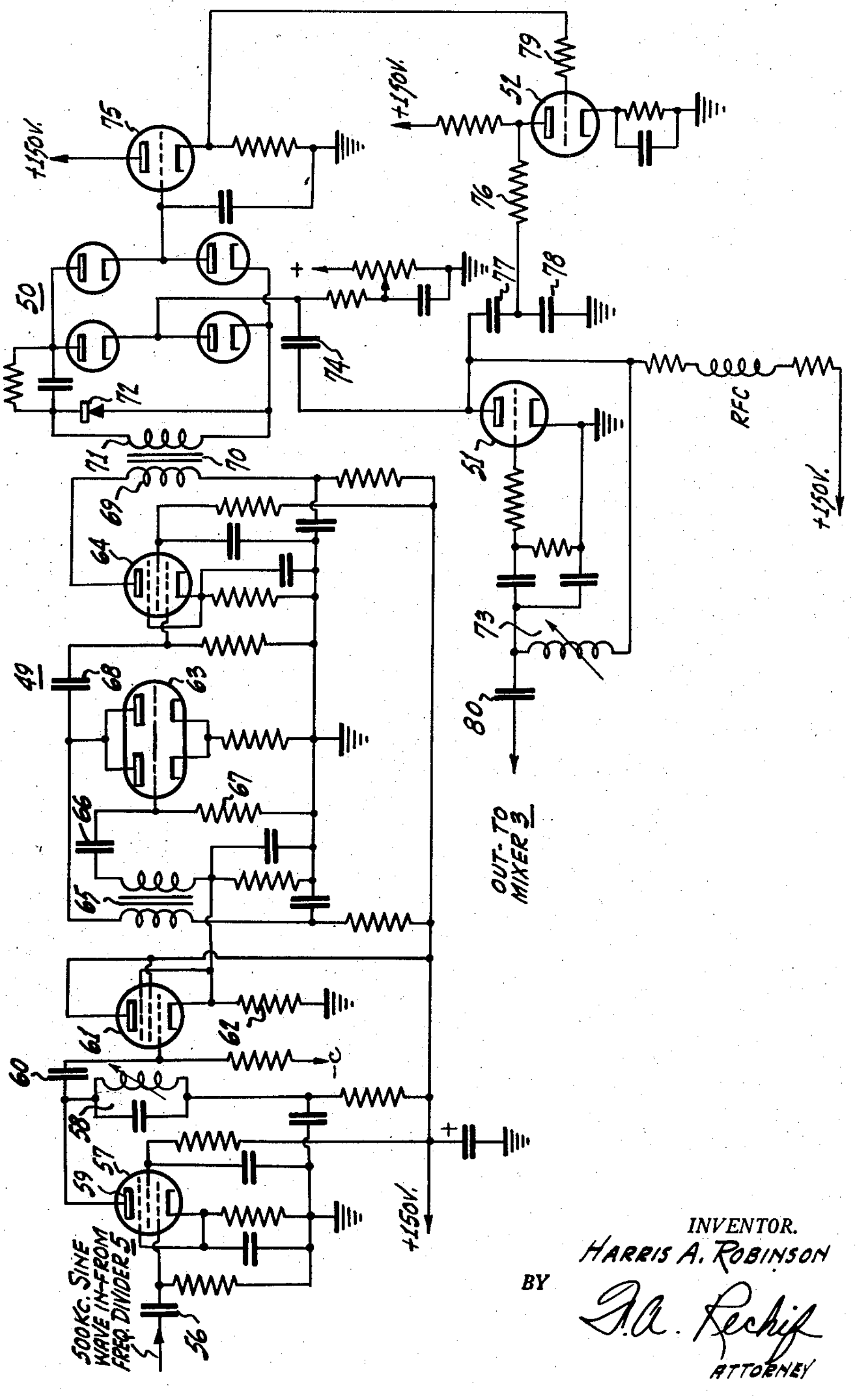
Figs. 4 and 5 are detailed circuit diagrams of certain parts of Fig. 3.

Fig. 4 is a detailed circuit diagram of typical circuitry which might be used for the first pulse-controlled oscillator system 49, 50, 52, 51 of Fig. 3. In this figure, the 500-kc. sine wave from frequency divider 5 is applied through a coupling capacitor 56 to the first or control grid of an evacuated electron discharge device (pentode) 57 (for example, a tube of the 6AK5 type) which is connected in a more or less conventional way, to act as an amplifier. The amplified voltage appearing across a tuned circuit 58 connected to anode 59 of tube 57 is coupled through a capacitor 60 to the control grid of a vacuum pentode 61 connected as a triode cathode follower type of amplifier. The further amplified voltage appearing across cathode resistor 62 connected to tube 61 is applied to the pulse generator 49, which includes a ringing or blocking oscillator tube 63 and a pulse sharpener tube 64. The two sections of twin triode tube 63 are connected in parallel, in a blocking oscillator circuit including a transformer 65 one winding of which is connected to the anodes of tube 63 and the other winding of which is coupled to the grids of this tube. By a suitable selection of the grid capacitor 66 and the grid leak resistor 67, intermittent oscillation is obtained. The setting may be adjusted so that the oscillating is interrupted after a few cycles and does not start again until the capacitor 66, which is charged because of the flowing of grid current, has been sufficiently discharged via the resistor 67. Thus, a series of periodic, damped, oscillations occurs in the anode circuit of the tube 63, the repetition frequency of these being largely determined by the values of 66 and 67.

The amplified 500-kc. signal (at the output of amplifier tube 61) is applied to the grids of tube 63. When the repetition frequency of the damped oscillations is approximately the same as the 500-kc. crystal-derived frequency which appears at the output of amplifier 61, synchronization occurs, and these frequencies will become identical. The damped oscillations obtained are applied to the grid of the vacuum tube 64 by way of a coupling capacitor 68. Tube 64 is negatively biased to such an extent that anode current flows therein only during part of the first half-cycle of each of the series of damped oscillations; this occurs because the amplitude is largest in the first half-cycle. Thus, short current impulses occur in the anode circuit of tube 64. The primary winding 69 of a pulse transformer 70 is incorporated in the anode circuit of tube 64, and with the tube and wiring capacitances it forms an oscillatory circuit. This circuit is periodically excited by the anode current impulses in tube 64. The secondary winding 71 of transformer 70 has a rectifier 72 connected across it so that the oscillatory circuit can pass on only half an oscillation every time it is excited, thus insuring voltage pulses of very short duration.

In the manner just described, pulses having a recurrence rate of 500,000 p.p.s. (synchronized by the 500-kc. reference frequency wave derived ultimately from the single reference crystal 4) are produced in push-pull (of opposite polarities) at the two ends of the secondary winding 71 of pulse transformer 70. The arrangement is such that positive pulses appear at the upper end of winding 71.

In the same manner as previously described in connection with Fig. 2, the ends of the pulse transformer secondary winding 71 are connected to the phase discriminator 50, which is quite similar in construction and operation to phase discriminator 20 in Fig. 2. A sample of the output of pulse-controlled oscillator 51 is taken off from the anode of tube 51 (which is connected to the oscillatory circuit 73) and is fed through a capacitor 74 to the phase discriminator 50. The phase discriminator 50 operates to sample the output of oscillator 51 in the same manner as previously described in connection with Fig. 2, and the output of discriminator 50 is applied through the cathode follower tube 75 by way of a resistor 79 to the triode control tube 52 to lock in the frequency of oscillator 51 to a whole multiple of the recurrence frequency of the 500,000-p.p.s pulses applied to said discriminator.

The triode electrode structure 51 with the LC oscillatory circuit 73, 77, and 78 forms an oscillator. Structure 51 provides the pulse-controlled oscillator which is synchronized or locked to harmonics of the 500,000-p.p.s. pulses supplied by pulse generator 49. The frequency of the output of oscillator 51 is influenced by the components of circuit 73, 77, and 78. Structures 51 and 52 are preferably mounted in the same envelope. The anode of structure 52 is direct coupled through a filter resistor 76 to a voltage-sensitive capacitor 78. The control tube 52 varies the D.C. polarizing voltage across the voltage-sensitive (ceramic) capacitor 78, and in this way varies the capacitance afforded by such capacitor. Thus, the triode structure 52 provides a control for the reactance 78, which control may be influenced by the voltage applied to the grid of tube 52, from the cathode of tube 75 through a resistor 79.

A portion of the output of the pulse-controlled oscillator 51 is taken off from the oscillatory circuit 73 and fed through a capacitor 80 to mixer 3, there to mix with a sample of the output of the master or captive oscillator 1′.

Figure 5:
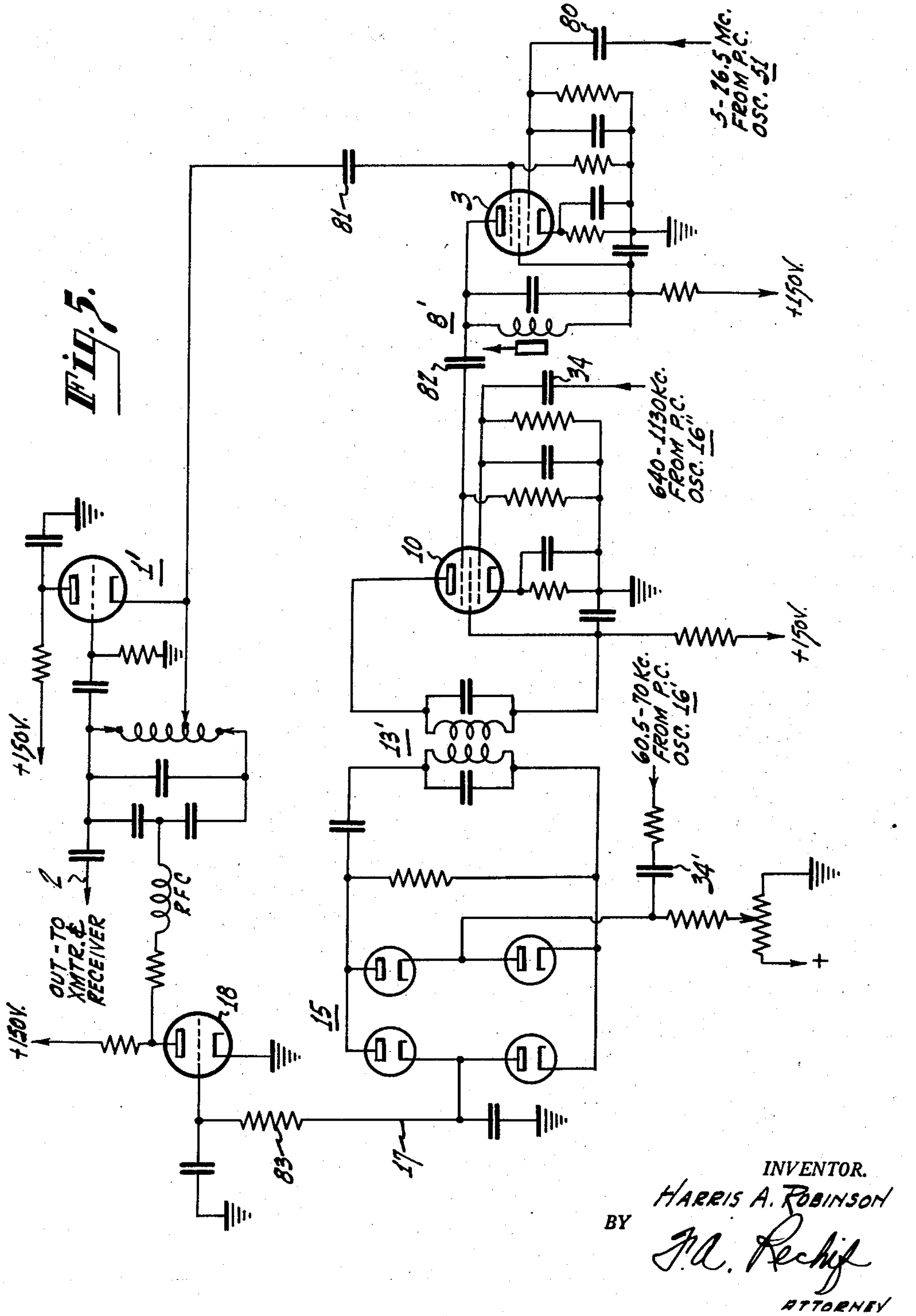

Fig. 5 is a detailed circuit diagram of the items in the main control channel of Fig. 3, including the mixers, bandpass filters, and the final phase discriminator which controls or locks in the master oscillator by means of a reactance tube. In this figure, a sample of the output of the master oscillator 1′ is fed through a coupling capacitor 81 to the third grid of a vacuum tube mixer 3, which may for example be of the 6BE6 type. For mixing purposes, output energy from pulse-controlled oscillator 51 (which, as previously stated, has a frequency which is a harmonic of 500 kc. and which lies in the range of 5 to 26.5 mc.) is fed through the coupling capacitor 80 to the first grid of mixer 3. The various beat frequencies appearing at the anode of tube 3 are applied to the bandpass filter (tuned circuit) 8′ which is connected to such anode and which is tunable over a range of 700 to 1200 kc., so as to pass certain selectable frequencies within this range.

The output of bandpass filter 8′ is applied through a coupling capacitor 82 to the third grid of a vacuum tube mixer 10, which may for example be of the 6BE6 type. For mixing purposes, output energy from pulse-controlled oscillator 16″ (which, as previously stated, has a frequency which is a harmonic of 10 kc. and which lies in the range of 640 to 1130 kc.) is fed through the coupling capacitor 34 to the first grid of mixer 10. The various beat frequencies appearing at the anode of tube 10 are applied to the bandpass filter 13′ which is connected to such anode and which consists of a pair of tuned circuits coupled together. Filter 13′ passes a band of frequencies extending from 60 to 70 kc.

The output of filter 13′ is applied in so-called push-pull (as one of the two inputs) to phase discriminator 15, by connecting the ends of the second of the two coupled circuits at 13′ to such discriminator. Phase discriminator 15 is quite similar in construction and operation to phase discriminator 20 in Fig. 2. Output energy from pulse-controlled oscillator 16′ (which, as previously stated, has a frequency which is a harmonic of 500 c.p.s. and which lies in the range of 60.5 to 70 kc.) is fed through a coupling capacitor 34′ to the phase discriminator 15. The phase discriminator 15 operates to sample the output of oscillator 16′ in substantially the same manner as previously described in connection with Fig. 2, and the output of discriminator 15 appears in output connection 17, which is direct coupled through a resistor 83 to the grid of the control tube 18 for a voltage-sensitive capacitor (reactance). The circuitry of the oscillator 1′ and tube 18 is more or less similar to that of Fig. 4. The control tube 18 is coupled to a voltage-sensitive capacitor to control the frequency of the master oscillator 1′, so that the output of discriminator 15 (whose amplitude and sign depend upon the magnitude and sense of the phase difference between the input from mixer 10 and that from pulse-controlled oscillator 16′), applied to this control tube, locks in or stabilizes the frequency of oscillator 1′.

What is claimed is:

1. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ means for feeding a reference frequency wave harmonically related to and locked to a respective one of said first-mentioned waves into each respective mixer, means feeding the output of each mixer to the input of the next successive mixer, an oscillator independent of and separate from said frequency divider chain, means responsive to one of said reference frequency waves for locking said last-mentioned oscillator to a frequency harmonically related to that of said last-mentioned one reference frequency wave, said locking means including a phase discriminator receptive of said last-mentioned one reference frequency wave and of the output of said last-mentioned oscillator and including also a frequency controlling device acting on said last-mentioned oscillator and coupled to the output of said discriminator; means for comparing the wave output of the last mixer with the output of said last-mentioned oscillator and for developing a control voltage in response to frequency or phase differences between the two waves being compared, and means responsive to said control voltage for controlling the frequency and phase of said multichannel oscillator.

2. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ means for feeding a reference frequency wave harmonically related to and locked to a respective one of said first-mentioned waves into each respective mixer, means feeding the output of each mixer to the input of the next successive mixer, a phase discriminator having two inputs and an output, means feeding the output of the last mixer to one of the discriminator inputs, an oscillator independent of and separate from said frequency divider chain, means responsive to one of said reference frequency wave for locking said last-mentioned oscillator to a frequency harmonically related to that of said last-mentioned one reference frequency wave, said locking means including a phase discriminator receptive of said last-mentioned one reference frequency wave and of the output of said last-mentioned oscillator and including also a frequency controlling device acting on said last-mentioned oscillator and coupled to the output of said discriminator, means feeding the output of said last-mentioned oscillator to the other of the discriminator inputs, and means coupled to the output of said discriminator for controlling the frequency and phase of said multichannel oscillator.

3. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ means for feeding a reference frequency wave harmonically related to and locked to a respective one of said first-mentioned waves into each respective mixer, at least one of said last-mentioned means comprising an oscillator independent of and separate from said frequency divider chain, means responsive to one of said reference frequency waves for locking said last-named oscillator to a frequency harmonically related to that of said last-mentioned one reference frequency wave, and means feeding the output of said last-named oscillator to a respective associated mixer, said locking means including a phase discriminator receptive of said last-mentioned one reference frequency wave and of the output of said last-named oscillator and including also a frequency controlling device acting on said last-named oscillator and coupled to the output of said discriminator; means feeding the output of each mixer to the input of the next successive mixer, means for comparing the wave output of the last mixer with a stable reference frequency wave and for developing a control voltage in response to phase differences between the two waves being compared, and means responsive to said control voltage for controlling the frequency and phase of said multichannel oscillator.

4. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ means for feeding a reference frequency wave harmonically related to and locked to a respective one of said first-mentioned waves into each respective mixer, at least one of said last-mentioned means comprising an oscillator independent of and separate from said frequency divider chain, means responsive to one of said reference frequency waves for locking said last-named oscillator to a frequency harmonically related to that of said last-mentioned one reference frequency wave, and means feeding the output of said last-named oscillator to a respective associated mixer, said locking means including a phase discriminator receptive of said last-mentioned one reference frequency wave and of the output of said last-named oscillator and including also a frequency controlling device acting on said last-named oscillator and coupled to the output of said discriminator; means feeding the output of each mixer to the input of the next successive mixer, an oscillator independent of and separate from said frequency divider chain, means responsive to one of said reference frequency waves for locking said last-mentioned oscillator to a frequency harmonically related to that of said last-mentioned one reference frequency wave, said last-mentioned locking means including a phase discriminator receptive of said last-mentioned one reference frequency wave and of the output of said last-mentioned oscillator and including also a frequency controlling device acting on said last-mentioned oscillator and coupled to the output of said last-named discriminator; means for comparing the wave output of the last mixer with the wave output of said last-mentioned oscillator and for developing a control voltage in response to frequency or phase differences between the two waves being compared, and means responsive to said control voltage for controlling the frequency and phase of said multichannel oscillator.

5. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ means for feeding a reference frequency wave harmonically related to and locked to a respective one of said first-mentioned waves into each respective mixer, at least one of said last-mentioned means comprising an oscillator independent of and separate from said frequency divider chain, means receptive of one of said first-mentioned waves for developing therefrom a series of recurring pulses, means coupled to said last-named oscillator and to said pulse developing means for locking the frequency of said last-named oscillator to a harmonic of the recurrence rate of said series of pulses, and means feeding the output of said last-named oscillator to a respective associated mixer, said locking means including a phase discriminator receptive of said series of pulses and of the output of said last-named oscillator and including also a frequency controlling device acting on said last-named oscillator and coupled to the output of said discriminator; means feeding the output of each mixer to the input of the next successive mixer, means for developing a series of recurring pulses from one of said first-mentioned waves, an oscillator independent of and separate from said frequency divider chain, means receptive of said last-mentioned pulses for locking the frequency of said last-mentioned oscillator to a harmonic of the recurrence rate of said last-mentioned pulses, said last-mentioned locking means including a phase discriminator receptive of said last-mentioned pulses and of the output of said last-mentioned oscillator and including also a frequency controlling device acting on said last-mentioned oscillator and coupled to the output of said last-named discriminator; means for comparing the wave output of the last mixer with the wave output of said last-mentioned oscillator and for developing a control voltage in response to frequency or phase differences between the two waves being compared, and means responsive to said control voltage for controlling the frequency and phase of said multichannel oscillator.

6. In a frequency control system for a multichannel oscillator, a frequency divider chain excited by a single stable frequency source for generating a plurality of reference frequency waves, $n$ mixers arranged in cascade, where $n$ is an integer greater than 1, means feeding a sample of the wave output of said oscillator into the first of said mixers, $n$ oscillators each independent of and separate from said frequency divider chain, $n$ means each operating to develop a respective series of recurring pulses from respective ones of said first-mentioned waves, $n$ means each coupled to a respective one of said last-mentioned oscillators and to a respective one of said pulse developing means and operating to lock the frequency of the respective coupled oscillator to a harmonic of the recurrence rate of the respective associated series of pulses, each of said locking means including a phase discriminator receptive of an associated series of pulses and of the output of its respective coupled oscillator and including also a frequency controlling device acting on a respective oscillator and coupled to the output of a corresponding discriminator; means feeding the output of each of said last-mentioned oscillators to a respective one of said mixers, means feeding the output of each mixer to the input of the next successive mixer, means for developing a series of recurring pulses from one of said first-mentioned waves, an oscillator independent of and separate from said frequency divider chain, means receptive of said last-mentioned pulses for locking the frequency of said last-mentioned oscillator to a harmonic of the recurrence rate of said last-mentioned pulses, said last-mentioned locking means including a phase discriminator receptive of said last-mentioned pulses and of the output of said last-mentioned oscillator and including also a frequency controlling device acting on said last-mentioned oscillator and coupled to the output of said last-named discriminator; means for comparing the wave output of the last mixer with the wave output of said last-mentioned oscillator and for developing a control voltage in response to frequency or phase differences between the two waves being compared, and means responsive to said control voltage for controlling the frequency and phase of said multichannel oscillator.

References Cited in the file of this patent

UNITED STATES PATENTS

| | | |
|---|---|---|
| 2,574,482 | Hugenholtz | Nov. 13, 1951 |
| 2,581,594 | MacSorley | Jan. 8, 1952 |
| 2,617,039 | Young | Nov. 4, 1952 |
| 2,648,006 | Mabry | Aug. 4, 1953 |
| 2,761,065 | Robinson | Aug. 28, 1956 |
| 2,777,064 | Robinson | Jan. 8, 1957 |